United States Patent
Yamamura

(10) Patent No.: US 7,289,235 B2
(45) Date of Patent: Oct. 30, 2007

(54) INFORMATION PROCESSING DEVICE, INFORMATION PROCESSING SYSTEM, METHOD FOR CONTROLLING INFORMATION PROCESSING DEVICE, STORAGE MEDIUM AND CONTROL PROGRAM

(75) Inventor: Shinichi Yamamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 826 days.

(21) Appl. No.: 10/202,901

(22) Filed: Jul. 26, 2002

(65) Prior Publication Data

US 2003/0030830 A1 Feb. 13, 2003

(30) Foreign Application Priority Data

Jul. 31, 2001 (JP) ............................. 2001-232696

(51) Int. Cl.
*G06F 15/00* (2006.01)

(52) U.S. Cl. ...................... 358/1.11; 358/1.6; 358/1.13; 358/1.15; 358/1.16; 358/1.18; 358/444; 345/636; 345/467; 345/471; 345/551; 345/650; 345/26

(58) Field of Classification Search ............... 358/1.11, 358/1.15, 1.6, 1.13, 1.16, 1.18, 444; 395/110; 345/467, 468, 469, 471, 551, 650, 26
See application file for complete search history.

(56) References Cited

U.S. PATENT DOCUMENTS

| | | | |
|---|---|---|---|
| 5,675,718 A | * | 10/1997 | Miller ........................ 358/1.11 |
| 5,689,723 A | * | 11/1997 | Lim et al. ..................... 715/542 |
| 5,742,838 A | * | 4/1998 | Lim et al. ..................... 715/535 |
| 5,889,481 A | * | 3/1999 | Okada .......................... 341/51 |
| 5,999,706 A | * | 12/1999 | Chrosny ..................... 358/1.11 |
| 6,354,752 B1 | | 3/2002 | Nakagiri ....................... 400/76 |
| 6,623,529 B1 | * | 9/2003 | Lakritz ........................ 715/536 |
| 6,675,358 B1 | * | 1/2004 | Kido .......................... 715/542 |
| 6,782,495 B2 | * | 8/2004 | Bernklau-Halvor .......... 714/44 |
| 2005/0168777 A1 | | 8/2005 | Nishikawa et al. ........ 358/1.15 |

FOREIGN PATENT DOCUMENTS

| | | |
|---|---|---|
| JP | 09-16355 | 1/1997 |
| JP | 2000-187570 | 7/2000 |

* cited by examiner

*Primary Examiner*—Twyler Lamb
*Assistant Examiner*—Vu Hang
(74) *Attorney, Agent, or Firm*—Fitzpatrick, Cella, Harper & Scinto

(57) ABSTRACT

In order to perform optimal character registration and a printing process depending on a language, in an information processing device connected to a printer having a first registration area and a second registration area as font registration areas, registration amounts in the first registration area and the second registration area are determined based on the language which the information processing device uses, and depending on the determined amounts, a first font is registered in the first registration area in the printer and a second font is registered in the second registration area.

13 Claims, 8 Drawing Sheets

| LOCALE ID | COUNTRY NAME | FONT DOWNLOAD METHOD |
|---|---|---|
| 0x0809 | United Kingdom | 1 Byte Download |
| 0x040c | French | 1 Byte Download |
| 0x0410 | Italian | 1 Byte Download |
| 0x0407 | German | 1 Byte Download |
| 0x040a | Spanish | 1 Byte Download |
| 0x0412 | Korean | 2 Byte Download |
| 0x0804 | Simplified Chinese | 2 Byte Download |
| 0x0404 | Traditional Chinese | 2 Byte Download |
| 0x0411 | Japanese | 2 Byte Download |
| ........ | ........ | ........ |

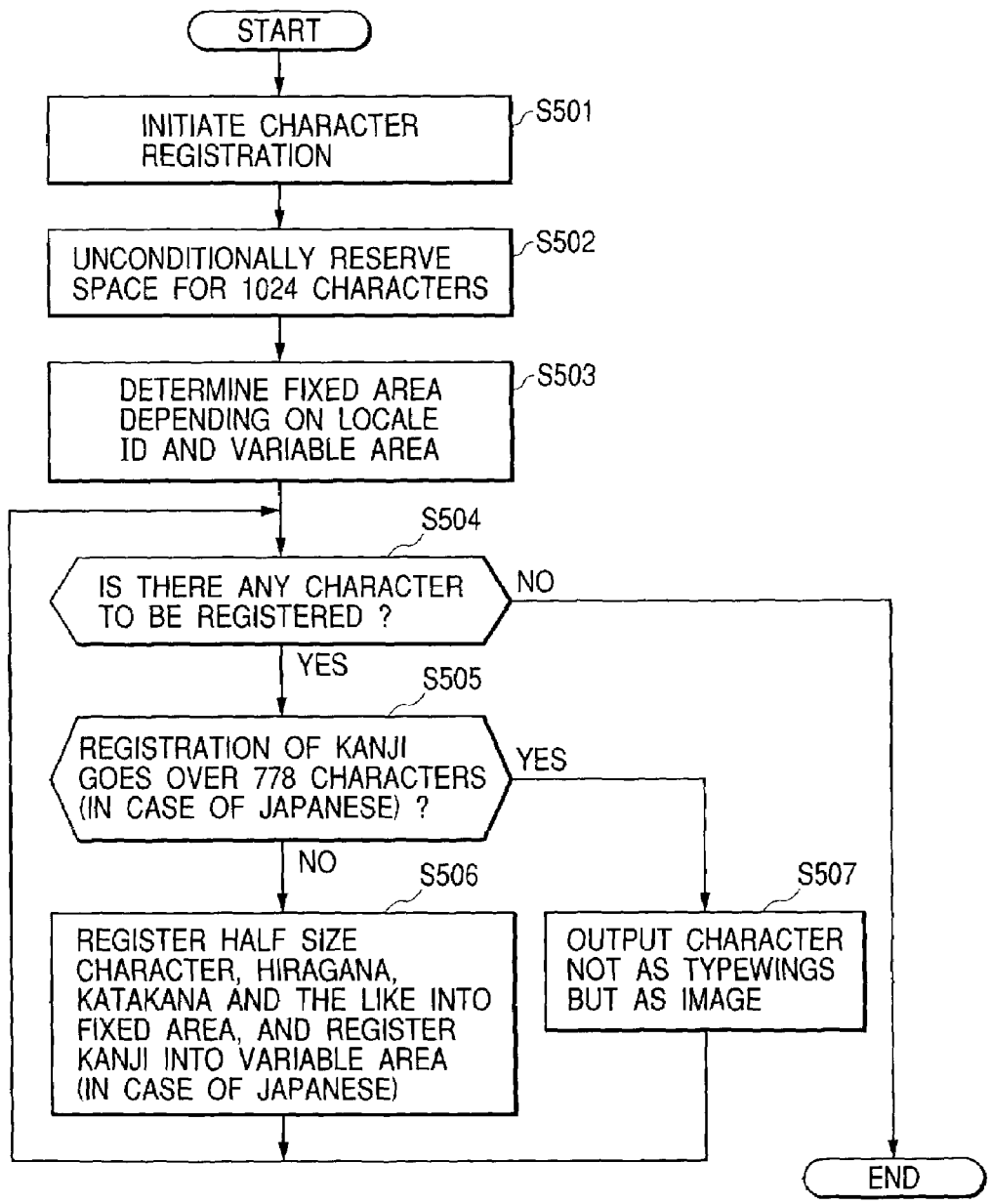

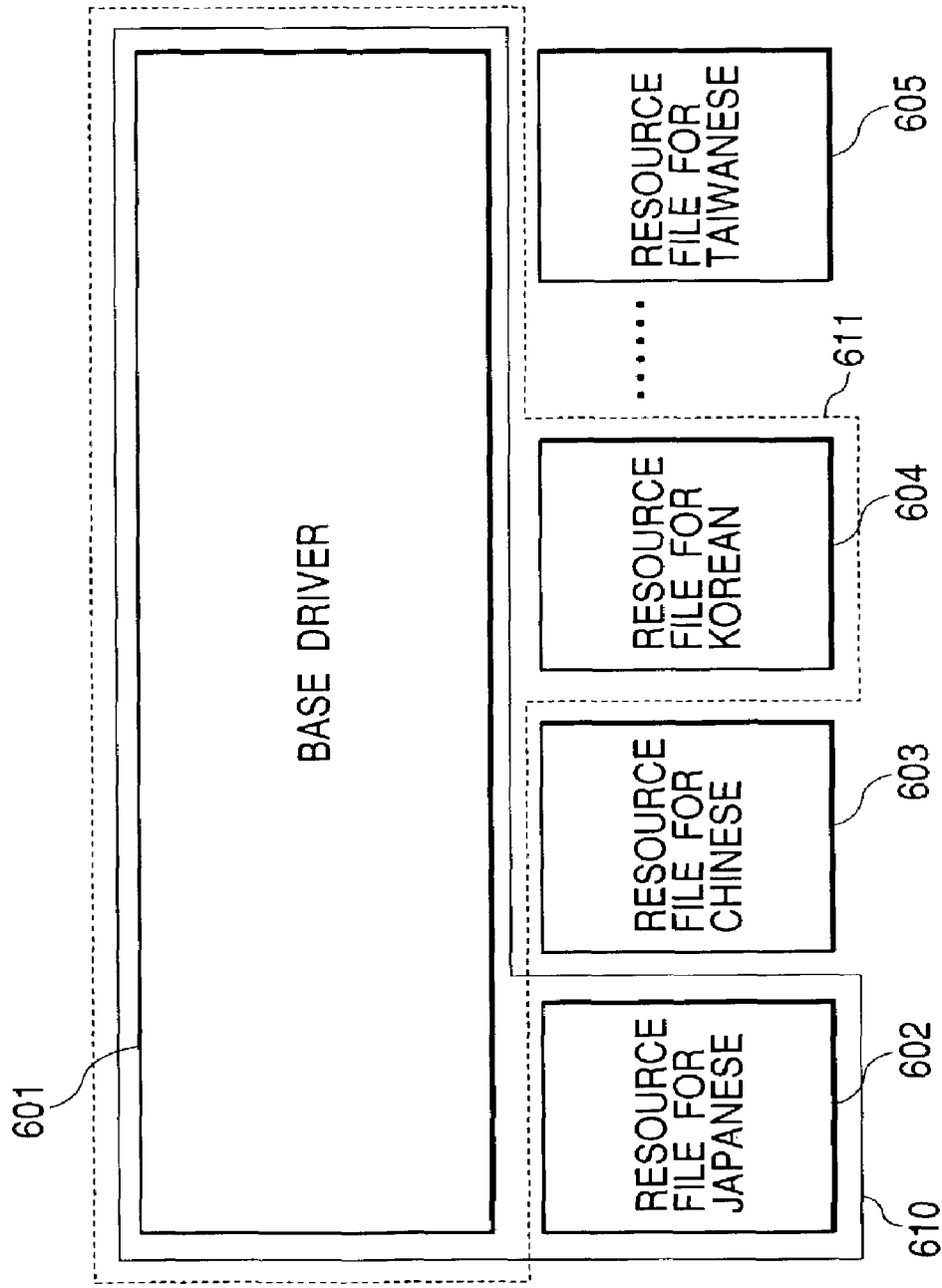

INFORMATION PROCESSING DEVICE, INFORMATION PROCESSING SYSTEM, METHOD FOR CONTROLLING INFORMATION PROCESSING DEVICE, STORAGE MEDIUM AND CONTROL PROGRAM

BACKGROUND OF THE INVENTION

1. Field of the Invention

The present invention relates to an information processing device and the like such as a personal computer connected to a printer, and more particularly to a control method for font registration with the printer.

2. Related Background Art

Commonly, in a system having a printer and an information processing device connected thereto, font registration areas called "fixed area" and "variable area" are provided at the printer. At the information processing device, the font registration is executed for these "fixed area" and "variable area" in a predetermined font registration method.

Generally, in the case of a printer description language for foreign languages, since the printer description language often has been originally adapted to support English or some of European languages (French, German and the like), the printer description language has been constituted mainly for 1-byte output. Thereafter, as a demand for 2-byte output occurs in a market, additional specification has been added as a supplement to the printer description language. However, since there have been many parts which are not well-defined in the specification, support for the 2-byte output depends on each vendor's capacity.

In addition, as to a printer driver for generating a printer control command, there are different methods for supporting it. Some vendors have released only a driver for 1-byte areas, others have replaced all of font download methods with that for 2-byte areas described in the supplement of the printer description language since some point.

However, in view of a situation where the demand in the 2-byte areas including China becomes high lately, the output of a 2-byte font has been regarded as essential as a function of the printer driver. This is natural because it is a requirement for raising sales to develop a new market, and the new market is Asian countries, in addition to China, where the 2-byte font are used.

However, as to the output of the 2-byte font, there are several languages such as Chinese almost consisting of kanji, Korean mainly consisting of hangul with relatively less characters, Japanese mainly consisting of hiragana and katakana, and also Central Europe (CE) such as Greek and Turkish having only a few characters of the 2-byte font therein. There has been a problem that optimal performance is not necessarily obtained when such languages are registered in the same font registration method. In addition, since the font registration for the 2-byte font uses a much more amount of data than that for a 1-byte font, this problem has been an element which has more effects on the performance.

In this regard, it is possible to consider a method for producing a driver for Chinese having allocated "fixed area" and "variable area" therein to be used in the font registration in consideration of the situation of Chinese almost consisting of kanji, a driver for Korean having allocated "fixed area" and "variable area" therein to be used in the font registration in consideration of the situation of Korean mainly consisting of hangul with relatively less characters, and a driver for Japanese having allocated "fixed area" and "variable area" therein to be used in the font registration in consideration of the situation of Japanese almost consisting of hiragana and katakana, so that each of the drivers is released for its target country. However, this method increases development cost and man-hours for maintenance.

In addition, since, for example, a Japanese resident officer resident in China and the like is supposed to often use the printer driver sold in China, that is, the driver for China in consideration of the situation of Chinese, with a Japanese OS, it also causes inconvenience in this case.

SUMMARY OF THE INVENTION

In view of the above-described problems, an object of the present invention is to provide an information processing device and the like which may constantly perform optimal character registration without increasing development cost and man-hours for maintenance, and also may improve printing performance for such as a 2-byte font and the like.

In order to achieve the above-described object, in the present invention, an information processing device connected to a printer having a first registration area and a second registration area as font registration areas comprises determination means for determining registration amounts in the first registration area and the second registration area, based on a language which the information processing device uses, and font registration means for registering a first font in the first registration area in the printer and registering a second font in the second registration area, depending on the registration amounts determined in the determination means.

BRIEF DESCRIPTION OF THE DRAWINGS

FIG. 8 is a flowchart showing a method for determining upper limit numbers of codes to be assigned to a fixed area and the codes to be assigned to a variable area; and FIG. 9 is a block diagram showing a configuration of a printer driver independent of a language.

DESCRIPTION OF THE PREFERRED EMBODIMENTS

Embodiments of the present invention will be described below based on the drawings.

[Entire Configuration of Information Processing System]

Figure 1:
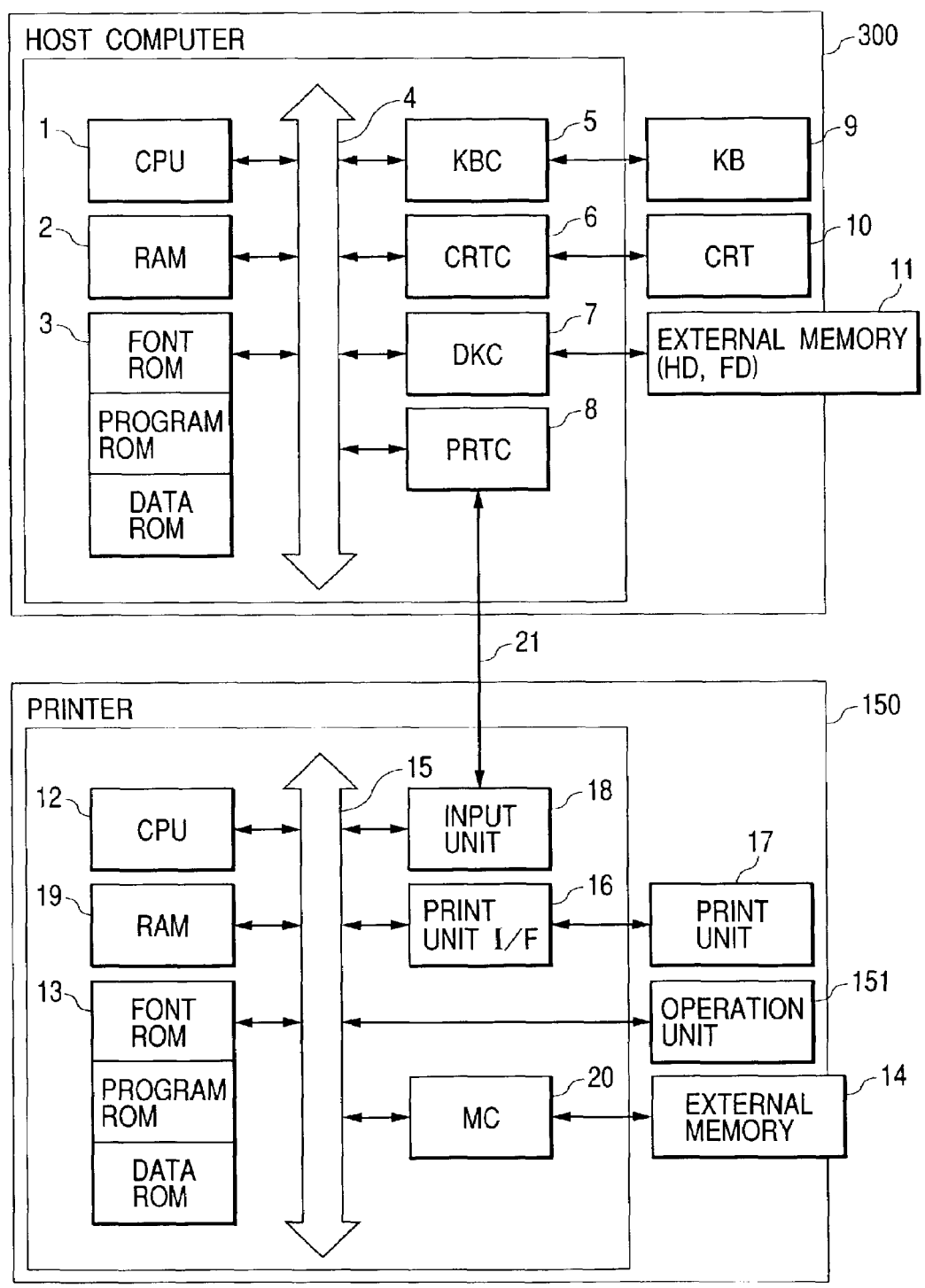
FIG. 1 is a block diagram showing an entire configuration of an information processing system according to an embodiment of the present invention.

FIG. 1 is a block diagram showing an entire configuration of an information processing system according to an embodiment of the present invention.

In this information processing system, a printer 150 is connected to a host computer 300 directly or via a network.

The host computer 300 is provided with a CPU 1 for processing documents including figures, images, characters, tables (including spreadsheets and the like) and the like, based on a document processing program and the like, which are stored in a program ROM in a ROM 3 or an external memory 11. The CPU 1 comprehensively controls each device connected to a system bus 4.

In the program ROM in the ROM 3 or the external memory 11, an operating system program (hereinafter, referred to as "OS") which is a control program of the CPU 1, programs related to flowcharts as will be described, and the like are stored. In a font ROM in the ROM 3 or the external memory 11, font data to be used in the above-described document processing and the like are stored. In a data ROM in the ROM 3 or the external memory 11, various data to be used in the above-described document processing and the like are stored. A RAM 2 functions as a main memory, a work area and the like of the CPU 1.

A keyboard controller (KBC) 5 controls key entries from a keyboard 9 or a pointing device (not shown). A CRT controller (CRTC) 6 controls display of a CRT display (CRT) 10.

Reference numeral 7 denotes a disk controller (DKC) for controlling access with the external memory 11, such as a hard disk (HD) or a floppy (R) disk (FD) and the like for storing a boot program, various applications, the font data, a user file, an edit file, a printer control command generation program (hereinafter, referred to as "printer driver") and the like.

A printer controller (PRTC) 8 is connected to the printer 150 through a two-way interface (interface) 21 to execute a communication control process with the printer 150. It should be noted that the CPU 1 executes a rasterization process, for example, for expanding an outline font into a display information RAM set on the RAM 2 and enables WYSIWYG on the CRT 10. The CPU 1 also opens various windows registered based on a command designated with a mouse cursor (not shown) and the like on the CRT 10 and executes various data processing. When a user executes a print process, the user may open the window related to a print setting to set settings of the printer or a print process method for the printer driver including print mode selection.

The printer 150 is controlled by a CPU 12. The printer CPU 12 outputs an image signal as output information to a print unit (printer engine) 17 connected to a system bus 15, based on a control program and the like stored in a program ROM in a ROM 13 or a control program and the like stored in an external memory 14. In the program ROM in the ROM 13, a control program of the CPU 12 and the like are stored. In a font ROM in the ROM 13, the font data and the like to be used to generate the above-described output information are stored. In a data ROM in the ROM 13, information and the like to be used on the host computer 300, in case of the printer without the external memory 14 such as the hard disk and the like, are stored.

The CPU 12 may execute a communication process with the host computer 300 through an input unit 18, and send information in the printer and the like to the host computer 300. A RAM 19 is a RAM functioning as a main memory, a work area and the like of the CPU 12, and is configured to be extendable in its memory capacity with an optional RAM connected to an expansion port (not shown). The RAM 19 is used for an output information expansion area, an environmental data storage area, NVRAM and the like.

The external memory 14, such as the hard disk (HD), an IC card and the like, is controlled in its access by a memory controller (MC) 20. The external memory 14 is optionally connected to be used to store the font data, an emulation program, a form data and the like, and also to be used as a spool of expanded print data. In addition, reference numeral 18 is provided with a switch, a LED indicator and the like for operation at the operation panel.

As to the above-described external memory 14, there may be not only one but also a plurality of them so that a plurality of option cards added with an internal font, memories for spooling the expanded print data, and external memories having stored programs for interpreting several printer control languages in different language systems, can be connected. In addition, the NVRAM (not shown) may be provided to store a printer mode setting information from the operation panel 151.

[Typical Print Data Generation Process]

Figure 2:
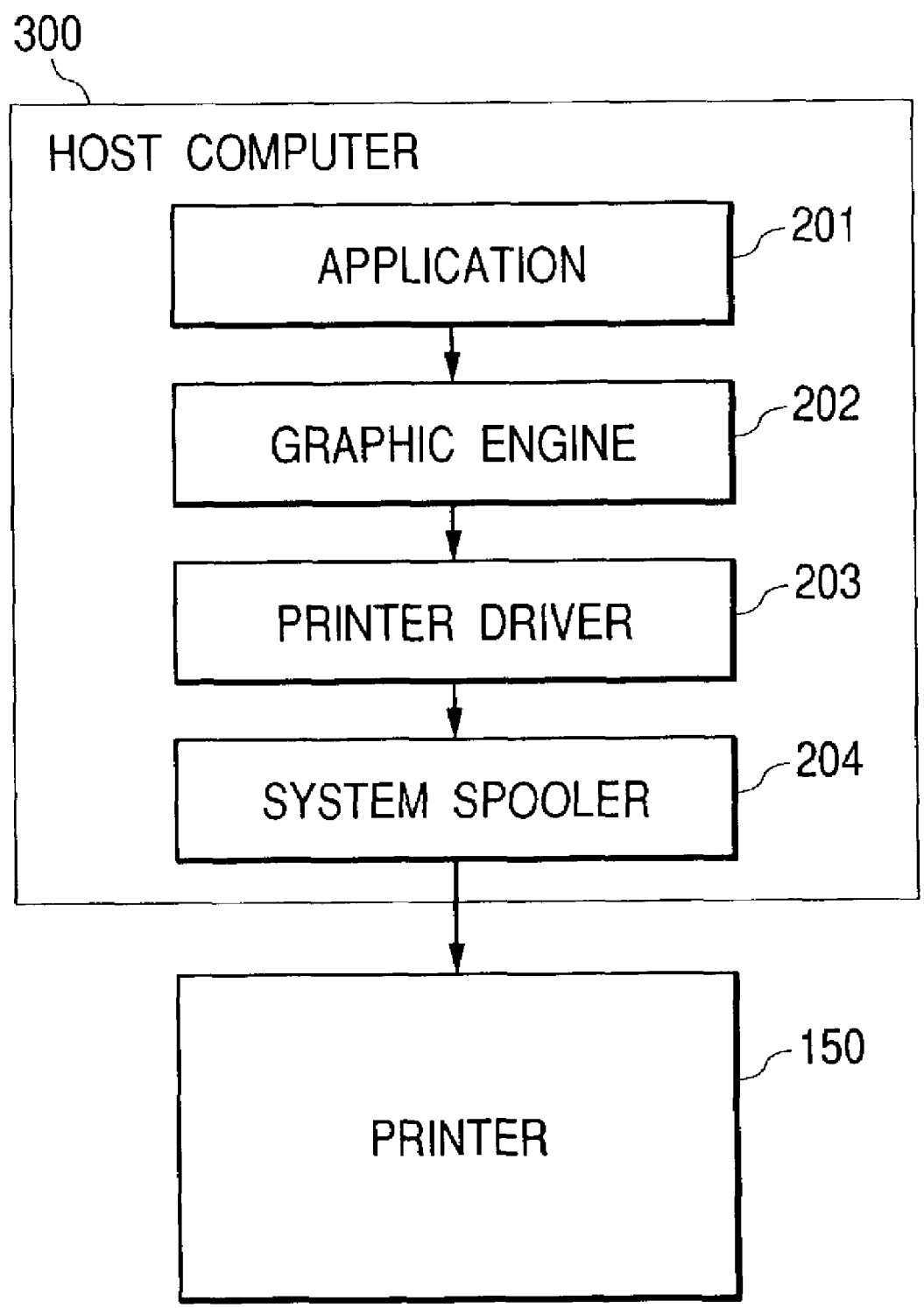
FIG. 2 is a configuration diagram showing a typical print data generation process.

FIG. 2 is a configuration diagram showing a typical print data generation process in the host computer.

An application 201, a graphic engine 202, a printer driver 203 and a system spooler 204 exist as files stored in the external memory 11. They are program modules to be loaded into the RAM 2 to be executed by a module, which uses the OS or its module when it is executed.

The application 201 and the printer driver 203 may be added on the FD of the external memory 11, a CD-ROM (not shown), or the HD of the external disk 11 via the network (not shown). The application 201 stored in the external memory 11 is loaded into the RAM 2 to be executed. When the print process is executed on the printer 150 from the application 201, an output (drawing) process is executed by means of the graphic engine 202 which has been loaded into the RAM 2 similarly to be executable.

The graphic engine 202 similarly loads the printer driver 203, which is provided for each printing device, from the external memory 11 into the RAM 2, and sets the output of the application 201 to the printer driver 203. Then, the graphic engine 202 converts a GDI (Graphic Device Interface) function received from the application 201 into a DDI (Device Driver Interface) function, and outputs the DDI function to the printer driver 203. The printer driver 203 converts the DDI function received from the graphic engine 202 into a control command which is recognizable to the printer, such as a PDL (Page Description Language). The converted printer control command is outputted as the print data, through the system spooler 204 loaded into the RAM 2 by the OS, via the interface 21 to the printer 150.

[Print Data Generation Process of the Present Embodiment]

Figure 3:
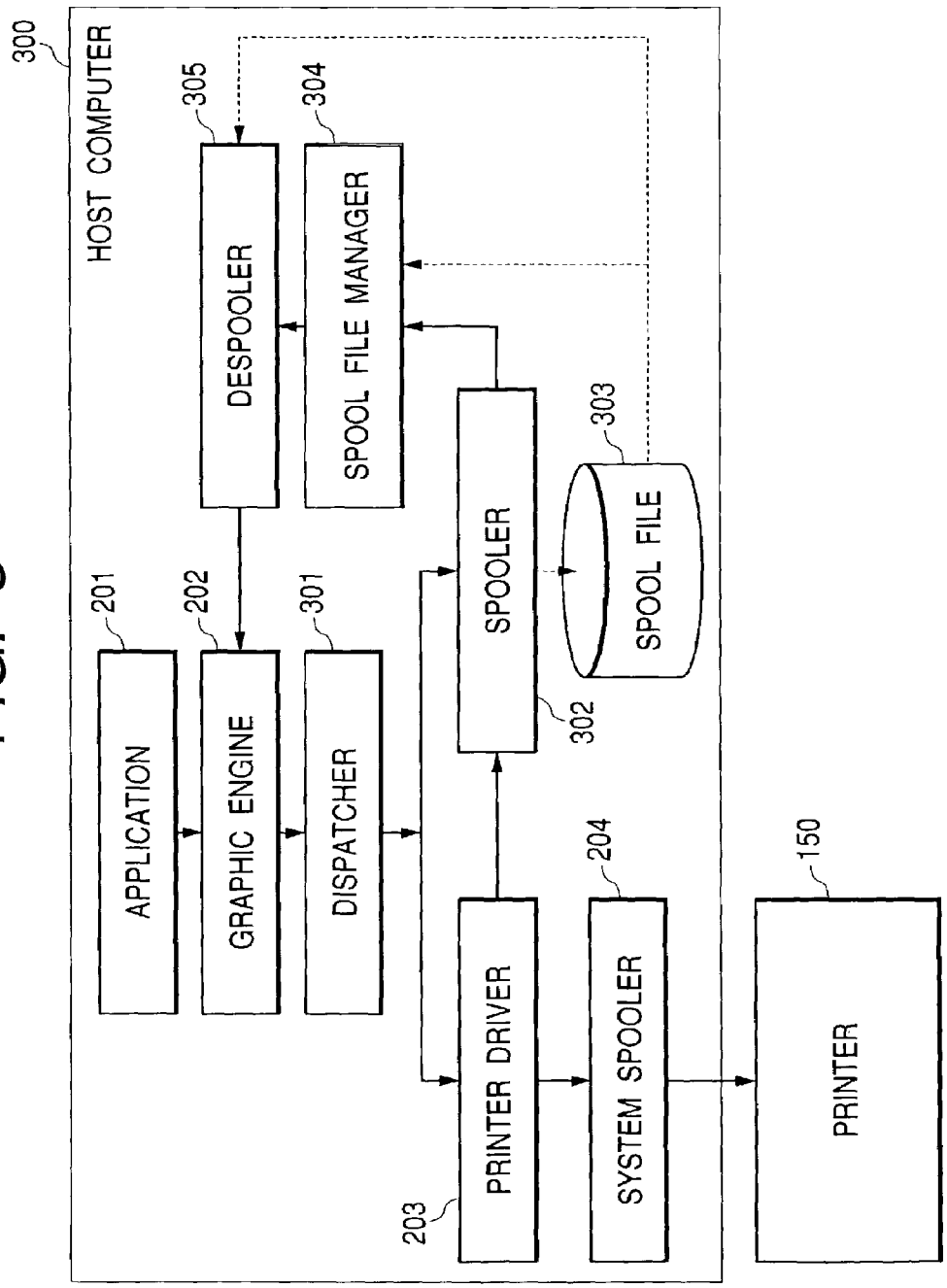
FIG. 3 is a configuration diagram showing a print data generation process according to the embodiment.

The information processing system of the present embodiment further has a configuration in which the print data from the application is temporarily spooled as intermediate code data as shown in FIG. 3, in addition to a print system including the printer 150 and the host computer 300 as shown in FIG. 2.

The system of FIG. 3 is an extended system of FIG. 2, and has a configuration in which, when a print command is sent from the graphic engine 202 to the printer driver 203, a spool file 303 consisting of the intermediate code is temporarily generated. That is, in the system of FIG. 2, the application 201 is released from the print process at the point when the printer driver 203 completes to convert all the print command from the graphic engine 202 into the printer control command. On the other hand, in the system of FIG. 3, the application 201 is released from the print process at the point when a spooler 302 converts all the print command into the intermediate code data and outputs them in the spool file 303. Generally, the latter system takes less time than the former one.

In addition, in the system shown in FIG. 3, contents of the spool file 303 may be processed. Thereby, it is possible to realize functions which are not included in the application, such as scaling, scaling a plurality of pages down into a single page to print and the like, toward the print data from the application.

For the above-described purposes, the system of FIG. 2 has been extended to spool with the intermediate code data as shown in FIG. 3. It should be noted that, in order to process the print data, the setting is executed from the window generally provided by the printer driver 203, and then the printer driver 203 stores contents of the setting on the RAM 2 or the external memory 11.

The detail of the system of FIG. 3 will be described below.

As shown in FIG. 3, in this extended process method, a dispatcher 301 receives the print command from the graphic engine 202. If the print command received by the dispatcher 301 from the graphic engine 202 is the print command issued from the application 201 to the graphic engine 202, the dispatcher 301 loads the spooler 302 stored in the external memory 11 into the RAM 2, and sends the print command to the spooler 302, not to the printer driver 203.

The spooler 302 converts the received print command into the intermediate code and outputs it in the spool file 303. The spooler 302 also acquires a process setting related to the print data set for the printer driver 203, from the printer driver 203, to store it in the spool file 303. It should be noted that the spool file 303 is generated as a file on the external memory 11, but it also may be generated on the RAM 2.

In addition, the spooler 302 loads a spool file manager 304 stored in the external memory 11 into the RAM 2, and informs a status of generating the spool file 303 to the spool file manager 304. Then, the spool file manager 304 determines whether the print process may be executed according to the contents of the process setting related to the print data stored in the spool file 303.

If the spool file manager 304 determines that the print process may be executed by means of the graphic engine 202, it loads a despooler 305 stored in the external memory 11 into the RAM 2, and instructs the despooler 305 to execute the print process of the intermediate code written in the spool file 303.

The despooler 305 processes the intermediate code included in the spool file 303 according to the contents of the process setting included in the spool file 303, and outputs it via the graphic engine 202 again.

If the print command received by the dispatcher 301 from the graphic engine 202 is the print command issued from the despooler 305 to the graphic engine 202, the dispatcher 301 sends the print command to the printer driver 203, not to the spooler 302.

The printer driver 203 generates the printer control command and outputs it via the system spooler 204 to the printer 150.

[Entire Process in Determining Font Download Method]

A process which characterizes the present embodiment will be described in detail mainly with reference to a flowchart shown in FIG. 4.

Figure 4:
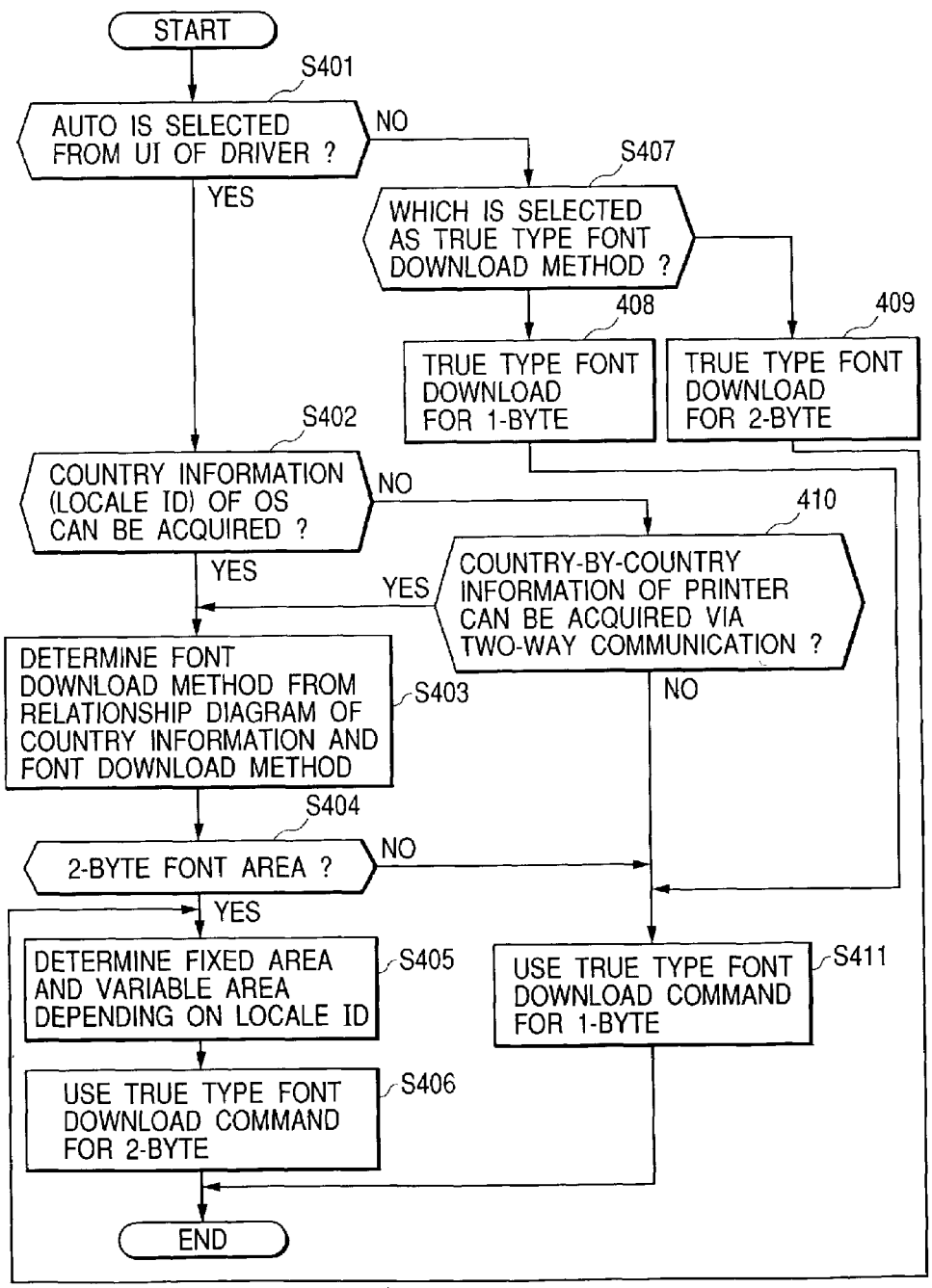
FIG. 4 is a flowchart showing an entire process flow in determining a font download method according to the embodiment.

FIG. 4 is a flowchart showing an entire process flow in determining a font download method according to the embodiment.

First, in step S401 of FIG. 4, it is determined whether, from a user interface (UI) of the printer driver 203, Auto is selected, font download for 1-byte is selected or font download for 2-byte is selected, as the font download method.

Figure 5:
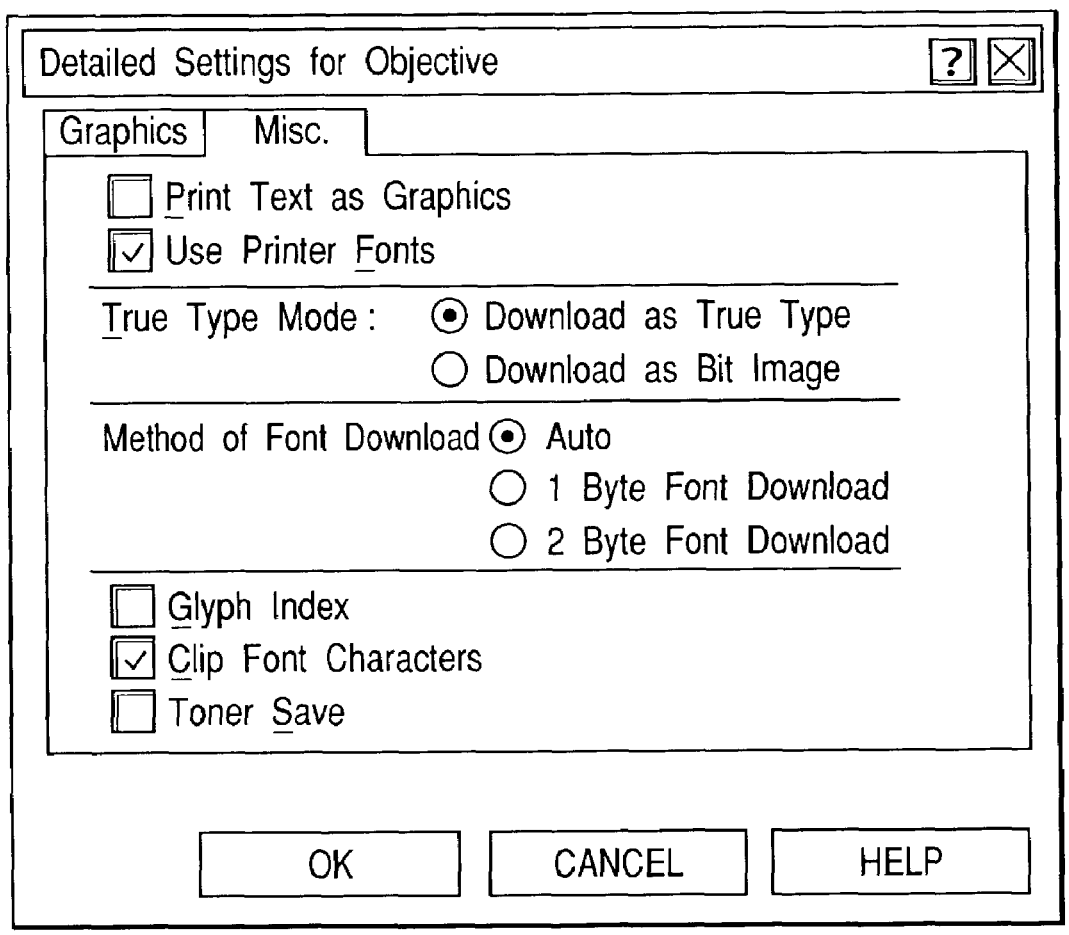
FIG. 5 shows an example of a user interface displayed according to the embodiment.

FIG. 5 shows an example of the user interface displayed at this point. In this example, if the font download for 1-byte or the font download for 2-byte is selected (step S407), TrueType download process is executed in the font download method designated in the printer driver 203, without reference to country information discriminated from a locale ID and a table specifying a TrueType font download method (in case of step S408, the process goes to step S411, and in case of step S409, the process goes to step S405.

Means for switching the font download method as described above is required for the user interface, because it is assumed that the printer driver 203 is also used in countries which are not defined in the above-described table (for example, the South America, the Middle East and the like).

Next, in step S402 of FIG. 4, it is determined whether the country information (locale ID) defined in the OS of Windows (R) can be acquired. If it can be acquired, the process continues with step S403, where the font download method is determined with reference to the country information discriminated from the locale ID and the table specifying the TrueType font download method.

Figures 6, 7:
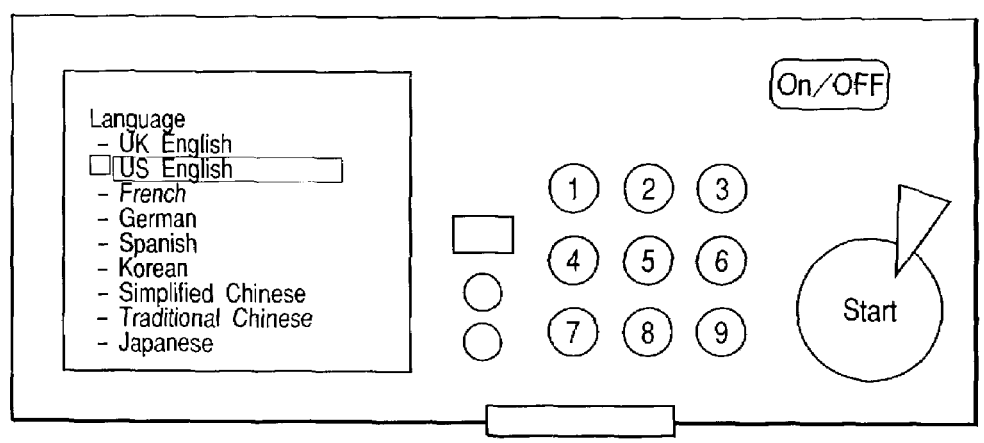
FIG. 6 shows a table specifying a TrueType font download method.
FIG. 7 shows an example of inputting country information at a printer.

FIG. 6 shows an example of the table referred in this point. For example, if "0x040C" is returned as the locale ID, the OS is determined as French according to a correspondence table, and then the font download for 1-byte is used, which is required for French (in case of FIG. 4, the process continues with the process of (1) from step S408). If "0x0412" is returned as the locale ID, the OS is determined as Korean according to the correspondence table, and then the font download for 2-byte is used, which is required for Korean (in case of FIG. 4, the process continues with the process of (2) from step S409).

In addition, if the locale ID is returned, which is not described in the correspondence table, the font download for 1-byte is used as a default. This correspondence table is produced on the basis of information from sales companies in each country. If the number of target countries for shipping of the printer driver 203 increases, the correspondence table should be updated sequentially.

In step S402 of FIG. 4, if the locale ID of the OS cannot be acquired, the process continues with a process of step S410, where country-by-country information in the printer is acquired via two-way communication. The two-way communication as described herein denotes a protocol for the two-way communication between the printer and the computer, such as Port 9100 of TCP/IP or SNMP (Simple Network Management Protocol).

FIG. 7 shows an example of inputting the country information at the printer. In this example, if the country information in the printer can be acquired, the process continues with step S403, where the font download method is determined with reference to the country information acquired from the printer and the table specifying the TrueType font download method. If the country information cannot be acquired, the process continues with a process of step S411, where the TrueType is processed with the font download for 1-byte as the default (which will be described in detail below), and the process is completed.

Next, if the font download method determined at step S403 is that of a 2-byte font area (step S404), the process continues with step S405.

In step S405, upper limit numbers of codes to be assigned to a fixed area and the codes to be assigned to a variable area are determined (the method for determining them will be described below), and in the following step S406, the TrueType is processed with the font download for 2-byte (which will be described in detail below), and then the process is completed.

[Method for Determining Upper Limit Numbers to be Registered in Fixed Area and Variable Area]

Next, a method for determining the upper limit numbers of the codes to be assigned to the fixed area and the codes to be assigned to the variable area, which is performed at the above-described step S405 in FIG. 4 will be described in detail with reference to a flowchart of FIG. 8.

First, in step S501, character registration for a 2-byte font is initiated, and in the next step S502, a space for 1024 characters are unconditionally reserved. Then in step S503, the space is divided into the fixed area and the variable area based on the locale ID previously acquired.

For example, if "0x0411" can be acquired as the locale ID, the OS is determined as a Japanese OS, then 246 characters are assigned to the fixed area, and 778 characters are assigned to the variable area. At this point, the characters to be registered in the fixed area are half size characters, hiragana and katakana, and that has been determined based on a frequency of printing output. In addition, kanji is assigned to the variable area.

If "0x0412" can be acquired as the locale ID, the OS is determined as a Korean OS, then 188 characters are assigned to the fixed area, and 836 characters are assigned to the variable area. At this point, the characters to be registered in the fixed area are hangul characters, and that has been determined based on the frequency of printing output. In addition, kanji is assigned to the variable area.

Next, an example of the maximum numbers of the characters to be assigned in the fixed area and the variable area in the present driver will be described.

In Japanese, fixed assigned codes are ANSI characters, the half size characters, hiragana, and katakana, and its maximum number of the characters to be assigned is 246 characters. In addition, variable assigned codes are the characters except the above-described characters (i.e., mainly kanji), and its maximum number of the characters to be assigned is 778 characters.

In Korean, the fixed assigned codes are the ANSI characters and the like, and its maximum number of the characters to be assigned is 188 characters. In addition, the variable assigned codes are the characters except the above-described characters (i.e., mainly kanji), and its maximum number of the characters to be assigned is 836 characters.

In Chinese/Traditional Chinese, the fixed assigned codes are the ANSI characters and the like, and its maximum number of the characters to be assigned is 116 characters. In addition, the variable assigned codes are the characters except the above-described characters (i.e., mainly kanji), and its maximum number of the characters to be assigned is 908 characters.

In Chinese/Simplified Chinese, the fixed assigned codes are the ANSI characters and the like, and its maximum number of the characters to be assigned is 119 characters. In addition, the variable assigned codes are the characters except the above-described characters (i.e., mainly kanji), and its maximum number of the characters to be assigned is 905 characters.

In step S503 of FIG. 8, after the maximum numbers of the characters to be assigned to the fixed area and the variable area are determined, the character registration is executed in step S504 and the following steps. However there is an upper limit in the number of characters registerable in the variable area.

That is, in step S505, for example in case of Japanese, since the maximum number of the characters to be assigned to the variable area is 778 characters, if the registration of kanji goes over 778 characters, the registration process may not be continued. In this case, the process continues with step S507, where TypeWing (TM) function is not used but the character is outputted as an image.

It should be noted that the TypeWing function determines whether the image of the character to be printed has been downloaded to the printer, by means of a table for storing information for identifying the character of the image downloaded in the printer. If it is determined that the character is not registered, the function expands the TrueType font as a character image at the host, downloads and registers the expanded character image into the printer, registers the downloaded character in the table so that it may be identified, and sends the code corresponding to the character to be printed to the printer. If it is determined that the character is already registered, once the function sends the code of the character to be printed to the printer, thereafter it may print the TrueType font more quickly by sending the code without sending the character image. This function is disclosed in detail in the U.S. Pat. No. 6,354,752.

If the registration of kanji is below 778 characters, the process continues with step S506, where the half size characters, hiragana, katakana and the like are registered in the fixed area, and kanji is registered in the variable area.

[TrueType Font Download Command]

Next, TrueType Font Download Command to be issued in the above-described steps S406 and S411 of FIG. 4 will be described. Note that the description denotes the case of using PCL language.

Step S406 denotes a process to be executed when the font download for 2-byte is selected. If "PCL5E/6 Printer Driver" is used, the next command is issued in this step.

For "PCL5E Printer Driver", in the TrueType font download, a font header Format15 is issued as the command. In a Bitmap font download, the font header Format20 s issued.

For "PCL6 Printer Driver", Class0 is designated with a ReadChar command.

Step S411 denotes a process to be executed when the font download for 1-byte is selected. If "PCL5E/6 Printer Driver" is used, the next command is issued in this step.

For "PCL5E Printer Driver", in the TrueType font download, the font header Format16 is issued as the command. In the Bitmap font download, the font header Format16 is issued.

For "PCL6 Printer Driver", Class1 is designated with the ReadChar command.

In case of the PCL language, since the download for 1-byte font and the download for 2-byte font are supported with different formats, the process as described above is required.

[Configuration of Printer Driver Independent of Language]

FIG. 9 is a block diagram showing a configuration of a printer driver independent of the language.

In FIG. 9, reference numeral 601 denotes a part called a base driver. The base driver converts the DDI function into the control command which is recognizable to the printer, such as the PDL (Page Description Language).

This part generally should be configured with common modules for all of destinations. However, if the upper limit numbers of the codes to be assigned to the fixed area and the codes to be assigned to the variable area are fixed depending on each of the destinations, the independence of the base driver may not be retained. However, as will be described in the present embodiment, if the upper limit numbers of the codes to be assigned to the fixed area and the codes to be assigned to the variable area are automatically altered depending on the locale ID of the computer in which the printer driver installed, it may be possible to produce the base driver independent of the destinations.

Next, reference numerals 602, 603, 604 and 605 denote resource files for each country. Since the resource files are responsible for the user interface, they should be produced individually for each country, and independently of the base driver 601.

If the printer driver has such a configuration as described above, it may be possible to produce the drivers individually for each country without recompiling, rebuilding and the like. For example, when the driver for Japanese is to be produced, it is possible to produce the base driver 601+the resource file for Japanese 602 (an area 610 surrounding with a solid line in FIG. 9), and when the driver for Korean is to be produced, it is possible to produce the base driver 601+the resource file for Korean 604 (an area 611 surrounding with a broken line in FIG. 9). Thereby, it may be possible to greatly reduce development cost and maintenance expense.

With the above-described process, it may be possible to automatically determine the upper limit numbers of the codes to be assigned to the fixed area and the codes to be assigned to the variable area, based on the country information discriminated by means for discriminating the locale ID. Thereby, it may be possible to execute the printing of the 2-byte font, which is to be remarked in the future, without degrading the performance of the system.

That is, in a conventional system, since the printer driver can allocate "fixed area" and "variable area" to be used for font registration only in a single wide frame of the 2-byte font, there has been a problem as described above. On the other hand, in the present embodiment, a single printer driver may variably alter "fixed area" and "variable area" to be used for the font registration to automatically alter them. That is, it may be possible to alter "fixed area" and "variable area" to be used for the character registration by referring to the locale ID held by the OS, so that the optimal character registration may be constantly performed.

It should be noted that the above-described control method may be realized by storing the programs according to the above-described flowcharts of FIG. 4 and FIG. 8 in the ROM 3 of the host computer 300 and operating them.

The present invention is not limited to the device of the above-described embodiment, and it may be applied to a system configured with a plurality of devices or a device consisting of a single device. It should be appreciated that the present invention is also completed by providing a storage medium in a system or a device, which has stored a program code of software for realizing the function of the above-described embodiment, and by reading and executing the program code stored in the storage medium by a computer (or a CPU or a MPU) of the system or the device.

In this case, the program code read by the storage medium realizes the function of the embodiment described above by itself, and the storage medium having stored the program code configures the present invention. For the storage medium for providing the program code, it is possible to use, for example, the floppy (R) disk (FD), the hard disk (HD), an optical disk, a magneto-optical disk, the CD-ROM, a CD-R, a magnetic tape, a nonvolatile memory card, and a ROM. In addition, it should be appreciated that the function of the embodiment described above is not only realized by executing the program code read by the computer, but also by executing a part or all of actual process by the OS operating on the computer and the like, based on instruction of the program code.

Furthermore, it should be appreciated that the function of the embodiment described above is also realized by writing the program code read by the storage medium, in a memory provided at a function extension board inserted into the computer or a function extension unit connected to the computer, and then, based on the next program code, executing its extension function by a CPU and the like provided at the extension board or the extension unit, to execute a part or all of the actual process.

As described above in detail, according to the embodiments of the present invention, it may be possible to constantly perform the optimal character registration without increasing the development cost and the man-hours for maintenance, and improve printing performance for such as the 2-byte font and the like.

What is claimed is:

1. An information processing apparatus connected to a printer, comprising:
   a printer driver including (a) a base driver for generating a control command which can be recognized by the printer and (b) resource files provided for respective countries for operating a user interface, wherein the printer driver variably alters a fixed storage area and a variable storage area of the printer to be used for registration of characters;
   a determination unit that determines, based on country information, a number of characters in a fixed storage area of the printer for registration of frequently used characters and a number of characters in a variable storage area of the printer for registration of less frequently used characters, wherein the number of characters in the fixed storage area and the number of characters in the variable storage area vary country by country; and
   a processing unit that, upon registration of a certain character in the printer, outputs the character to the printer as an image if the number of characters in the variable storage area determined by said determination unit is exceeded, and registers the character in the printer if the number of characters in the variable storage area determined by said determination unit is not exceeded.

2. An apparatus according to claim 1, wherein if the country information cannot be obtained, said determination unit does not determine the number of characters in the fixed storage area and the number of characters in the variable storage area in accordance with the country information.

3. An apparatus according to claim 1, wherein the country information includes a locale ID obtained from an operating system.

4. An apparatus according to claim 1, wherein the country information is obtained from a printer.

5. An information processing method for an information processing apparatus connected to a printer, comprising:
   a printer driver including (a) a base driver for generating a control command which can be recognized by the printer and (b) resource files provided for respective countries for operating a user interface, variably altering a fixed storage area and a variable storage area to be used for registration of characters;
   a determination step of determining, based on country information, a number of characters in a fixed storage area of the printer for registration of frequently used characters and a number of characters in a variable storage area of the printer for registration of less frequently used characters, wherein the number of characters in the fixed storage area and the number of characters in the variable storage area vary country by country; and a processing step of, upon registration of a certain character in the printer, outputting the character to the printer as an image if the number of characters in the variable storage area determined in said determination step is exceeded, and registering the character in the printer if the number of characters in the variable storage area determined in said determination step is not exceeded.

6. A method according to claim 5, wherein if the country information cannot be obtained, said determination step does not determine the number of characters in the fixed storage area and the number of characters in the variable storage area in accordance with the country information.

7. A method according to claim 5, wherein the country information includes a locale ID obtained from an operating system.

8. A method according to claim 5, wherein the country information is obtained from a printer.

9. A computer-readable storage medium on which is stored a computer readable program that causes a computer to execute an information processing method for an information processing apparatus connected to a printer, comprising:

a printer driver including (a) a base driver for generating a control command which can be recognized by the printer and (b) resource files provided for respective countries for operating a user interface, variably altering a fixed storage area and a variable storage area to be used for registration of characters;

a determination step of determining, based on country information, a number of characters in a fixed storage area of the printer for registration of frequently used characters and a number of characters in a variable storage area of the printer for registration of less frequently used characters, wherein the number of characters in the fixed storage area and the number of characters in the variable storage area vary country by country; and a processing step of, upon registration of a certain character in the printer, outputting the character to the printer as an image if the number of characters in the variable storage area determined in said determination step is exceeded, and registering the character in the printer if the number of characters in the variable storage area determined in said determination step is not exceeded.

10. A computer-readable storage medium according to claim 9, wherein if the country information cannot be obtained, said determination step does not determine the number of characters in the fixed storage area and the number of characters in the variable storage area in accordance with the country information.

11. A computer-readable storage medium according to claim 9, wherein the country information includes a locale ID obtained from an operating system.

12. A computer-readable storage medium according to claim 9, wherein the country information is obtained from a printer.

13. A computer-readable storage medium according to claim 9, wherein said program comprises a base driver and a resource file provided country-by-country.

* * * * *

UNITED STATES PATENT AND TRADEMARK OFFICE
CERTIFICATE OF CORRECTION

PATENT NO. : 7,289,235 B2 Page 1 of 1
APPLICATION NO. : 10/202901
DATED : October 30, 2007
INVENTOR(S) : Yamamura It is certified that error appears in the above-identified patent and that said Letters Patent is hereby corrected as shown below:

COLUMN 8:
Line 34, "s" should read -- is --.

COLUMN 9:
Line 1, "driver" should read -- driver is --.

COLUMN 11:
Line 23, "computer readable" should read -- computer-readable --.

Signed and Sealed this

Fifteenth Day of July, 2008

JON W. DUDAS
*Director of the United States Patent and Trademark Office*